(12) United States Patent
Yankelevich et al.

(10) Patent No.: US 8,639,566 B2
(45) Date of Patent: Jan. 28, 2014

(54) METHOD AND SYSTEM FOR CREATION, DISTRIBUTION, AGGREGATION, RETURN, DONATION, EXCHANGE, VERIFICATION, REDEMPTION AND CLEARING OF INCENTIVES

(75) Inventors: Dmitry Yankelevich, Moreland Hills, OH (US); Yuriy K. Krasnov, Euclid, OH (US)

(73) Assignee: Reliable Business Group, Inc., Cleveland, OH (US)

( * ) Notice: Subject to any disclaimer, the term of this patent is extended or adjusted under 35 U.S.C. 154(b) by 797 days.

(21) Appl. No.: 12/600,361

(22) PCT Filed: May 16, 2008

(86) PCT No.: PCT/US2008/006302
§ 371 (c)(1),
(2), (4) Date: May 10, 2010

(87) PCT Pub. No.: WO2008/143984
PCT Pub. Date: Nov. 27, 2008

(65) Prior Publication Data
US 2010/0217658 A1    Aug. 26, 2010

Related U.S. Application Data
(60) Provisional application No. 60/938,716, filed on May 18, 2007.

(51) Int. Cl.
*G06Q 30/00* (2012.01)
(52) U.S. Cl.
USPC ........................................................ 705/14.1
(58) Field of Classification Search
USPC ........................................................ 705/14.1
See application file for complete search history.

(56) References Cited

U.S. PATENT DOCUMENTS

2004/0193489 A1*    9/2004    Boyd et al. .................. 705/14

* cited by examiner

*Primary Examiner* — Daniel Lastra (57) ABSTRACT

The present invention provides a space and all necessary procedures enabling visitors to create, distribute, aggregate, exchange, return, donate, verify, redeem, account and clear different kinds of incentives by commonly available means and tools, where the specific commodity (promotional programs) is exchanged for special consideration.

20 Claims, 3 Drawing Sheets

METHOD AND SYSTEM FOR CREATION, DISTRIBUTION, AGGREGATION, RETURN, DONATION, EXCHANGE, VERIFICATION, REDEMPTION AND CLEARING OF INCENTIVES

CROSS REFERENCES TO RELATED APPLICATIONS

This application claims priority upon U.S. provisional application Ser. No. 60/938,716 filed May 18, 2007, hereby incorporated by reference.

DESCRIPTION OF THE INVENTION

1. Field of the Invention

The present invention relates generally to a method and a system for providing promotion of commerce or contest to customers or participants and more specifically to a method and a system for providing promotions programs based upon the implementation of incentives.

As used herein, the term "incentive" refers to any legally enforceable promise of one person or entity (a Giver of incentive) to make a transfer of designated tangible or intangible asset to another entity or person (a User of incentive), if this last one, a User, will accomplish actions or behavior, or achieves results required in designated conditions within designated time frame, and if neither one of required actions, nor behavior, nor results can be legally considered as a job done for the promissory.

2. Background Art

It is well known that manufacturers, retailers, service providers, publishers and entertainers spend a significant amount of resources to promote their products and services, to entice Users (customers, participants, spectators, readers, etc.) to acquire (purchase, consume, enjoy, learn, download, explore, etc.) a particular product, or service, or performance, or knowledge, etc. One of the widely spread manners of such promotions is a distribution of incentives in the form of discounts, gifts, prizes, warranties, coupons, contest, sweepstakes, points, games, free samples, tie-in, cross-sell, up-sell promotions, etc.

Recently there appeared several Web Sites on Internet that are dedicated entirely to the promotion of incentives of their clients—manufacturers, retailers, services, credit institutions and entertainers. Several patented and implemented strategies, systems and methods of targeting customers, based on their purchase history, customers feedback and solvency ratings that are established by many different ways, are already developed. All of them are aimed to increase the commercial efficiency of implemented promotional programs while substantially decreasing the expenditures of promoters on issuance and distribution of incentives.

With the advent of Internet, many Givers of incentives are practicing the distribution of incentive through their Web Sites. There are well-known e-commerce sites like www.e-coupon.com, www.coolsavings.com, www.directcoupons.com, www.speciallinks.com, www.coupondirectory.com, www.meals.com, www.supermarkets.com, etc., etc., that implement embodiment of coupons distribution that can be redeemed on the Internet or on subsequent visits to the store. However, traditional methods of distribution of incentives by hardware—posters along the highways, mail, telemarketing, print media like papers, magazines, coupons and booklets, etc., still are playing an important role and are not forgotten.

U.S. Pat. No. 7,013,286 to Aggarwal et al. for "Generation, distribution, storage, redemption, validation and clearing of electronic coupons" proposed a method and system that handles generation, distribution, storage, redemption, validation and clearing of electronic manufacturer coupons and electronic store coupons comprising of issuance of "unforgable blank digital coupons" that are further customized and signed "by the promoter and distributed to potential customers", which "may either present these coupons electronically for redemption to an online store, or print these coupons and present them to a convenient offline store". Implementation of this approach can drastically prevent frauds in coupon practice at traditional methods of distribution of incentives by hardware.

The practice of implementation of incentives has clearly shown that the possibility of exchange with accumulated incentives and aggregating them for planed shopping plays a significant role for customers' involvement in the incentive-based promotional program. That fact has inspired many new approaches. For instance, U.S. Patent Application No. 20020169662 from Christensen at al. for "System and method for aggregating and distributing electronic coupons" proposed "a system and method for receiving, distributing, and exchanging electronic discount coupons over a computer network such as the Internet" wherein "the exchange includes the receipt of data representing a new electronic coupon from one client computer in trade for a transmission of data representing the selected electronic coupon".

With incoming wireless videophones era the World has assimilated a new very powerful, maybe even more powerful than Internet, platform for implementation of any promotional program. This platform is capable to unify any efforts of promotions of products and services with satisfaction of any consumption needs of customers, and will be capable to globalize such efforts for the entire World. The system and methods of distribution of incentives should be ready for the correspondence with such tremendous possibilities. Particularly, mobile phones, and more specific—specialized hand held wireless devices like Personal Digital Assistant, or PDA, which can be connected to a desktop computer, network or other digital processing devices via infrared, direct wire, or wireless communications, significantly increasing customer's ability to prepare shopping cart before it will reach point-of-sale due to possibility of arranging of purchases with beforehand collected incentives and choosing and obtaining available new ones, etc., etc. U.S. Patent Application No. 20040193499 from Ortiz, Luis M., at al. for "Transaction broker" proposes a powerful usage such kind of devices wherein the associated with product incentive "can be stored within a memory of the hand held device for retrieval at a point of sale".

The practice of implementation of incentives has clearly shown that the respect of the privacy of customers plays a dramatic role for the customers' involvement in the incentive-based promotional program. U.S. Patent Application No. 20030204445 from Vishik, Claire S., at al. "System and method for supporting anonymous transactions" proposes the system and method that deliver a solution of problems that do arrive in cases when "it may be difficult to balance the need for anonymity against the need to guarantee or carry out payment for the goods or services and the need to assure timely fulfillment of an order".

From other side the same practice of implementation of incentives has clearly shown that promoters of incentive-based programs desperately need to know very much about customers, their preferences, shopping history, area of interests, etc. to make targeted offers of appropriate incentives. It is not an "idle curiosity", but a way to dramatically decrease huge expenses for issuance and distribution of not-targeted incentives. And there appears the dilemma: how to balance the respect of the customer's privacy and the necessity of a targeted promotion of products and services. People have tried to resolve this dilemma for many years, and the example of a "fresh" proposal of a solution of this dilemma is U.S. Patent Application No. 20050004873 from Sweeney, Duane, at al. "System and method for compounded marketing", wherein "when the vendor offering is communicated to the User, the User's address or the User's identity is not revealed to the vendor"

In recent years it was recognized that the centralization of solutions of all problems arising from the incentive-based promotional programs in one easy-to-get-in place would be the best way to increase the commercial efficiency of such programs. U.S. Patent Application No. 20040249712 from Brawn, Sean D., at al. for "System, method and computer program for presenting, redeeming and managing incentives" proposes a good example of such approach for the managing and simplification of the customer-retailer relations in respect to incentive-based promotional programs.

Analysis of all economical and legal aspects of the customer-retailer-manufacturer, or more widely, User-Redeemer-Giver, relations in respect to incentive-based promotional programs shows that the main source of many of occurring problems is a simple fact: the important information and solutions are scattered, extended, pulled apart by different participants of a complex process of an implementation of such programs. If the process of issuance of incentives by Givers (vendor, manufacturer, resellers, etc), the process of receiving of incentives by Users (customers, contestants, etc), and storage of reports on redemption of these incentives would be concentrated in one hands, there would be no need of any "middle men". Indeed, middle agents as "validation centers", "clearing houses", "anonymity providers", "targeting distributors", marketing agents, leads generating firms, etc. will become unnecessary elements of the whole process, because all participants can satisfy their interests from the same source, in the same place at the highest security, authenticity, accountability and privacy. And this place, this source of satisfaction of the interests of all participants of the incentive-based promotion programs should be the real market. The market that considers and treats the incentive-based promotional programs as a special commodity; the market where this commodity is exchanged for a special consideration—the Users desire to participate in those programs; the market that acts in accordance with commonly accepted rules of a Free Market. In this case it is easy to provide a minimum risk of frauds, unauthorized use and useless distribution of incentives for the all and each stage of the entire process of the implementation of promotion incentive-based programs. And very important problems—the reduction of the cost of implementation of such programs and the increasing of the efficiency of use of incentives will find their best resolutions.

Therefore, the central problem that really needs to be solved in such approach will be the following:
  First of all, we should find the answers to really crucial questions: "How to bring the Users, the Givers and the Redeemers in such a place? What features should this place provide to each of these categories of the natural participants of the incentive-based promotional programs that inspire them and bring them together?"
  Secondly, we should find methods that provide all such features;
  And finally, we should establish all procedures of interaction of all aforementioned participants through use of these features in such a way, that each of them has an opportunity to get satisfaction for all their needs and to reach all their goals with the maximum efficiency and protection.

DISCLOSURE OF INVENTION

Accordingly, the object of the present patent is the invention of method and system providing the functionality of the aforementioned market of the incentive-based promotional programs and for solving of the aforementioned central problem.

It is obvious that User of the promotional offers is one that has some consumption needs and wants to satisfy them in the most affordable way and in a user-friendly atmosphere. Because Users make the final decision of what promotional program has to be used, they have a right to know all existing offers to choose from. Users should have tools to make the optimal choice, to be able to find information on all aspects of existing offers that will influence their decision, and they should be guaranteed that the declared qualities of offers will be delivered. It is obvious that Users will appreciate the clarity, simplicity and rapidity of all procedures that needed to be done. Users definitely will highly appreciate the security of information about their actions and the deep respect of their privacy. Users will appreciate the possibility to find opinions, learn experiences and share their concerns with other Users. Users will be nicely amazed if in some certain place they will have an opportunity to change their mind in the middle of an implementation of promotion program, and make exchange of their preliminary achievements in one program, which became useless for them, for achievements of other users in other programs. And many Users will be definitely amazed if finally, when they come to the point of redemption, they receive awards and rewards that will be the most profitable for them, no matter how well they have arranged this final act by their own efforts. It is obvious that providing of all these possibilities and opportunities in one place would inspire Users to be in such a place and definitely will bring them together in this place.

Issuers of the promotional programs, the Givers, have actually only one goal: to convince as many Users as possible to participate in their incentive-based promotional programs. It is obvious that no matter how good and promising the promotional program is, it will not be effective if it does not reach Users. Therefore, the prime interest of Givers is to have as many Users on a market of promotional programs as possible. Because Giver is the one who is paying for the implementation of these programs, they are directly interested to make these programs in the cheapest way without losing the quality of an implementation. It is obvious that Givers will appreciate the clarity, simplicity and rapidity of all procedures that needed to be performed to issue and distribute these programs. It is obvious that Givers will highly appreciate the security, accuracy and completeness of information about implementation of the promotion programs. Givers will be very grateful if the manner of implementation of their promotional programs will exclude any possibility of fraud. Givers will appreciate an opportunity to learn experiences and share their concerns with other Givers. Givers will be nicely amazed if, in one place, they would have an opportunity to exchange their promotional programs with programs of other Givers, negotiate and make deals for launching of their joint promotional programs. And Givers will be definitely amazed if they would have an opportunity to meet Redeemers, negotiate and make contracts with them for redemption of Givers' promotion programs. It is obvious that providing of all these possibilities and opportunities in the same place would inspire Givers to be there and will bring them together.

Redeemers are the people who redeem incentives of promotional programs for a living, therefore, they are genuinely interested in the involvement in the promotional programs of as many Users as possible. At the moment of redemption, the Redeemer needs to know what has to be redeemed, and what the redemption has to be. Therefore, Redeemers are genuinely interested to receive the accurate authentic information in a timely fashion. As soon as the redemption is done, the Redeemer becomes interested in the clearing of this redemption. Therefore, Redeemers will appreciate the possibility of an automatic clearing procedure, which would be appreciated by the Givers also, because it would insure and guarantee that they are paying only and exactly for real results of implementation of their promotional programs. Redeemers will appreciate an opportunity to learn experiences and share their concerns with other Redeemers. Redeemers would definitely appreciate it if in one place they would have the opportunity to meet Givers, negotiate and make contracts with them for the redemption of Givers' promotion programs. It is obvious that providing of all these possibilities and opportunities in some place would inspire Redeemers to be there and will brings them together.

As one can see, both parties, Givers and Redeemers, have a grate interest to involve as many Users as possible in promotional programs. From the economical point of view, Users have the same genuine interest: it is important for Users as well, that as many Users be active and involved in the promotional programs of Givers. Indeed, the wide spectrum of offers, multitude of competitive conditions and terms for the promotional programs, variety of discounts and lavishness of them in very big measure depend on mass scale of Users' participation in the promotional programs. As Economics teaches us, the root of all discounts is its ability to accelerate sales, its ability to increase the turnover of capitals. That is why the mass scale of the Users' involvement is so critical to effectiveness of any promotional program. That is why the interest of Users, their comfort and satisfaction at any implementation of any promotional program is fundamental to the embodiment of this method.

From the economical point of view, Users have another genuine interest: all offers available to Users should be formed through fair competition of Givers. In other words, not only the products and services that the programs are promoting, but the UM's presentation and distribution of these programs to Users should also be the result of a fair competition among Givers.

Gathering exclusive information on all activities of all participants of the promotional programs implementations in one place makes it easy to provide new types of services, such as arrangement of returns of merchandize, repairs, refunds, replaces, etc. All that becomes available on the base of totally authentic, clarified and certified documentation automatically prepared by manager of such marketplace. Such services definitely would be appreciated by all of participants: Users, Givers and Redeemers.

All said objectives would be achieved by implementing a novel system and methods of marketing of the promotional programs—United Market of InCents, or UM. As used herein, the term "UM" refers to the usual scientific notion—the free market, as it is defined in Economics. Therefore, UM should be understood as a place (physical or virtual), where Demand and Offer meet together to be transformed in Consumption. UM should be understood as a place (physical or virtual) where participants of the implementation of promotion programs meet together to negotiate, to make deals that are satisfying their needs, to arrange plans for future options and deals. UM should be understood as a place (physical or virtual) where exchanges of offered valuables for requested valuables occur; where participants are acting in good faith, and each and all relations are based on the following principles:

No discrimination—everyone is treated the same without any distinguishing;

First come, first served;

Declaration of quality—every offer has to be accompanied with a clear and recognizable description of the offered valuable, and the offering party is legally responsible for declared quality of offered assets;

Deals are legally enforceable—as long as an agreement is achieved, all participants are legally responsible for accomplishment of their parts of it;

Full respect of the privacy of Users: taker of offer has a right to remain anonymous;

Full support of the openness of Givers: Users have the right to know whose offer they are taking and what Giver has to be responsible for made offer;

Full support of the openness of Redeemers: User has the right to know from what hands he gets the award and what Redeemer should be responsible for properties of awards and production he/she redeems.

Fair competition of offers: the presentation and distribution of all offers are performed at conditions and terms of a fair competition of all promoters with each other.

UM does not participate in promotional programs as a party, it only serves and protects the procedure of distribution, collection, storage and analysis of the information on issuance, distribution, aggregation, exchange, verification, clearing and rewarding of incentives.

All those Principles are declared in UM Policy and have to be accepted by any visitor to become a registered member of UM.

As used herein, the term "InCent" refers to the following set of five documents that are bound together in the one universal package: 1)—the incentive, as a legally enforceable promise, as it is defined above; 2) —the symbolic or naturalistic physical, visual, sound or digital, or all just listed joined in any combination, image of incentive; 3)—the recorded rewarding terms & conditions of implementation of incentive, describing what behavior should be accomplished or what result should be achieved under which conditions and in what time frame, to get one rewarded with a promised award; 4)—the recorded distribution instruction, describing procedure, limits and conditions of distribution of incentive among potential Users of it, the incentive's expiration time, etc; 5) —and associated promotional materials that could contain informative and promotional forms (like advertisement, links, photos, videos, texts, etc.), which issuer would like to accompany the issued incentive within the space, which would be apportioned by UM for that.

According to the first announced Principle—"No discrimination—everyone is treated the same without any distinguishing", there is no possibility to any Giver to make UM distribute any incentive among Users selectively, without getting a permission of each particular User to be enrolled in such kind of distributions. Therefore, every User has an option to instruct UM on what type of incentives (among all of those that are distributed automatically) he/she allows to be booked on his/her UA, and/or implement to his/her purchases. According to this Principle there will be no favoritism on for any of Users, Givers and/or Redeemers: no matter how active they are on UM, all of them will be treated by UM equally.

According to the first announced Principle—"No discrimination—everyone is treated the According to the second announced Principle—"First come, first served", any case of distribution of incentives among Users and/or representation of incentives to Users, at the absence of some special instruction of User, will be realized on UM with usage of and in respect to incentive from InCent, which was arrived on UM the most earlier. In cases when an implementation of this Principle does useless effect, it will be used a random selection among equivalent incentives.

According to the third announced Principle—"Declaration of quality", any problem that would occur in respect of quality of made offer will be understood by UM from the point of view that "User is always right".

According to the fourth announced Principle—"Deals are legally enforceable", UM will provide such forms and documents that they could be used as proof of legal responsibilities of all participants, that they have taken upon opening of accounts in UM and making deals with other UM members.

According to the fifth announced Principle—"Full respect of the privacy of Users", UM will provide such manners of all kind of activities on UM that any User will be able to accomplish any of those that are consistent with the level of anonymity which User will choose.

According to the sixth announced Principle—"Full support of the openness of Givers", UM will provide such procedure, which will give Users full understanding of whose offer they are taking and what Giver has to be responsible for made offer.

According to the seventh announced Principle—"Full support of the openness of Redeemers", UM will provide such procedure, which will give Users full understanding of where he gets the award from and what Redeemer should be responsible for properties of awards and production he/she redeems.

According to the eighth announced Principle—"Fair competition of offers", UM will supply its members only with such tools and procedures that provide and support the fair competition of the members.

According to the ninth announced Principle—"UM does not participate in promotional programs as a party", UM will not interfere or participate in any kind of deals and/or interactions of its members with each other; UM only serves them with information that they could request in the order and within the list that are announced in UM Policy.

UM will provide the ultimate use of a commercial power of the incentive-based promotional programs: each customer at the point-of-sale, or POS, will obtain full package of benefits (discounts, points, etc.) for each bought product that is currently available on UM, disregard to User's pre purchase activity. Without any doubts any User of UM will welcome this feature. This option does not exclude a necessity of a User's activity for preparation of its UA and collecting the appropriate incentives on UA before shopping. Indeed, at the moment of payment for selected "basket" on POS there might be no applicable incentives in distribution (for instance, other Users might have taken all appropriate incentives).

Because objects of offers, that are presented on UM, are InCents, there is no money or any kind of monetary equivalents, which are involved in any exchange that can occur on UM. Generally speaking, UM is a market where Givers' promotion programs are exchanged for Users' willingness and intention to participate in.

Aforementioned arguments definitely are providing a strong base to be sure that Users, Givers and Redeemers will come together in such a market to use its power for resolution of their problems and satisfaction of their needs. The system and methods providing the creation and maintenance of such United Market, or UM, is particularly that the present patent claims as an invention.

BRIEF DESCRIPTION OF THE DRAWINGS

A more complete appreciation of the invention and many of attendant advantages thereof will be readily obtained as the same becomes better understood by reference to the following detailed description when considered in connection with the accompanying drawings, wherein:

FIG. 3: Schematics of interaction of User with Redeemer at the Point of Redemption (particularly—at Point of Sale in store) in case when Redeemer's server has no on-line connection with UM server. In this case the User gathers all needed information about products using some portable communication device (wireless phone, PDA, kiosk, or any hand held communication device). Transferring this information to UM server, User triggers necessary operations in UM system, including his own research of available options of shopping, gets needed information from UM, and makes decision for choice of purchase "basket" and stores all necessary information in the portable communication device and sends to UM server. UM selects all incentives that are applicable to the given redemption event and transfers it to the User's portable communication device back. As soon as selection of needed merchandise is accomplished, User brings the chosen "basket" to the redemption point. At the point of redemption User connects his portable communication device by any available way (for instance—plugging his portable communication in the Redeemer server net) and transfers all necessary data from the portable communication device to the Redeemer's server. In response, the Redeemer's server transfers required information, including its own identification number, to the portable communication device, and issues bill that already includes all applicable awards. User accepts bill, arranges payment, and transfers final information to UM server. At receiving of such information, UM server makes all necessary entries in all involved accounts and erases the used nickname and Redeemers ID from memory of the User's portable communication device. User gets his purchase together with deserved award. The main feature of this method of redemption is that User provides the communication with UM through own portable communication device.

DESCRIPTION OF THE PREFERRED EMBODIMENT

For the preferred embodiment of the present invention, the personal computers implemented into a computing network such as the Internet is the best medium. UM in this embodiment is realized as a Web Site that can be accessed by any Internet-compatible device; in the case of the preferable embodiment it could be a personal computer, or PC. The schematics of functional blocks of such Web Site is shown in FIG. 1.

Figure 1:
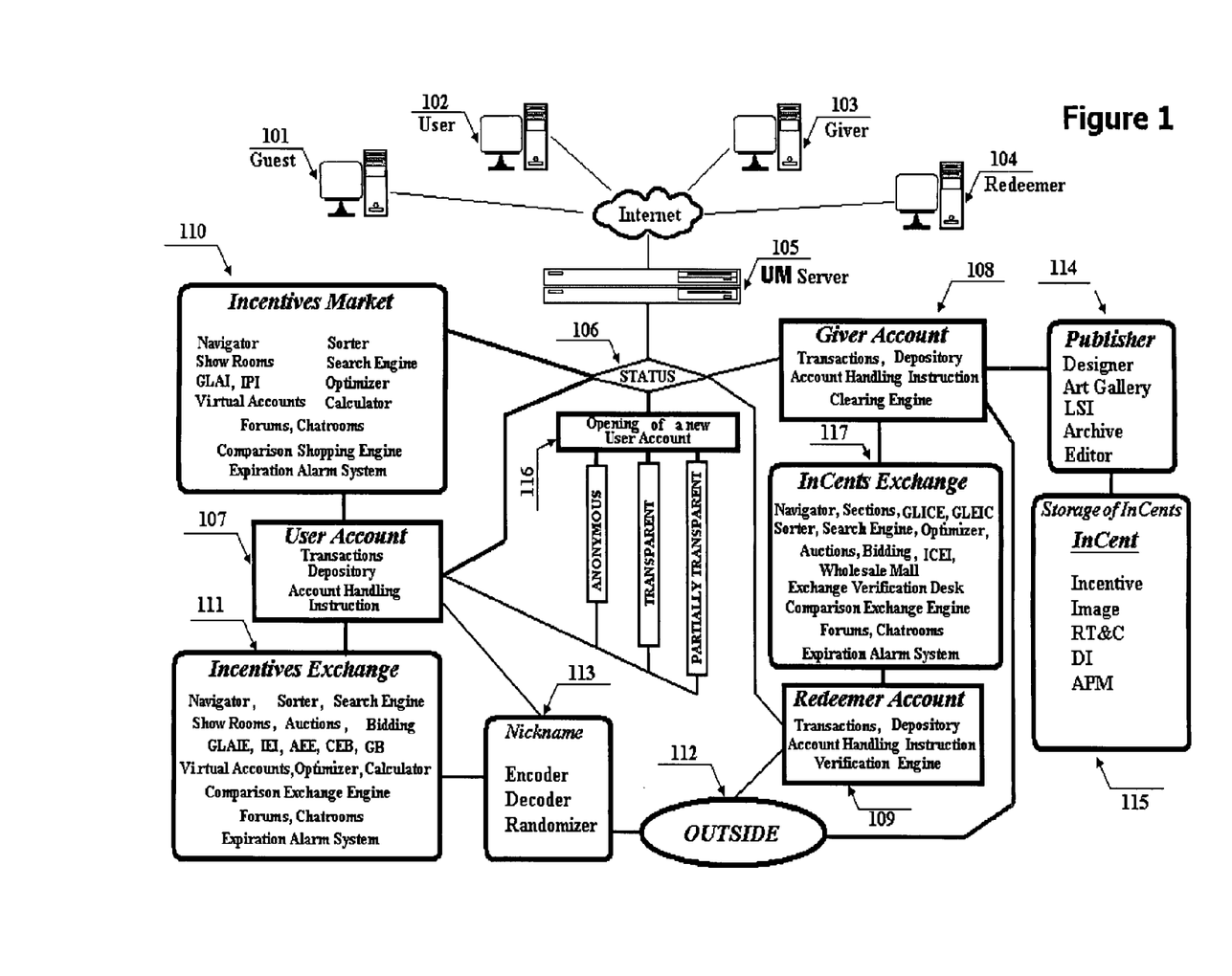
FIG. 1: A system for providing creation, distribution, promotion, exchange and use of incentives in a complex of all its major components is shown. All structural elements of system are incorporated in internal communication net (not shown), so that UM Manager does management of all of them using information stored in UM Database, and UM Messenger (not shown) can receive messages from and send messages to any Account. All major structural elements are shown together with emphasizing of the most important blocks that they content.

According to claimed invention, UM Server 105 in FIG. 1 recognizes four classes of visitors of UM: guests 101, who are visitors that came to UM simply to see what is going on there; the Users 102, who are registered on UM and have their personal User Accounts 107 there; the Givers, who are registered on UM and have their personal Giver Accounts 108 there; and Redeemers 104, who are registered on UM and have their personal Redeemer Accounts 109 there. Each visitor, which has no "cookies" in his PC that allows UM Server 105 to recognize the linked PC as already registered member of UM, is redirected to the STATUS page of Web Site 106, where visitor should define his/her status and log into his/her personal or corporate Account. Visitors, who have defined their status as "guest", are redirected directly to Incentive Market 110. After log-in, the Users are redirected to the entry page of UA 107, Givers—to the entry page of GA 108, and Redeemers—to the entry page of RA 109. Visitors that have corresponding "cookies" in their PC are automatically redirected to their Account's entry page, 107, 108 or 109.

The STATUS page contains an option "Open an account" that redirects visitor on the "Opening of Account" page 116, which allows any visitor to open account of any kind: User Account, UA; Giver Account, GA; or Redeemer Account, RA. At registration of account each visitor is offered UM Policy which visitor should carefully read and agree to. At acceptance of this Policy visitor will be offered a correspondent account's Opening page, where visitor can establish Account Handling Instruction, AHI, choose password and the accountholder's "Users name" for future log-in.

Visitor, which will disagree with UM Policy and will not accept it, will be politely escorted out of UM.

The Users can open three types of UA: anonymous, partially transparent or transparent. Anonymous UA means that even UM will not know User's identity, and any other personal information (age, gender, address, e-mail, phone number, etc), besides current "User name" and log in password that are chosen by User and could be changed time by time by the User. Partially transparent UA means that User did share some personal information with UM and allows UM to share some of it with other members of UM (what should be clearly stated in AHI), but other personal information, commonly used at the commercial relations, is not available even for UM. Transparent UA means that all personal information, which is commonly used at commercial relations, is available for UM and is allowed to be shared with other members of UM at request.

Being on the entry page of the Incentives Market, or IM, 110 guests can enjoy variety of possibilities of a selection and observation of all currently available incentives. Through the IM Navigator they can visit any Show Room of IM 110, arranging wanted displays beforehand by wanted categories of incentives (discounts, points, "buy x get y free", entry tickets, warranties, "buy x and get incentive for y", etc., etc.) and types of products or services (clothing, food, cars, games, etc., etc.) using IM Sorter. If something is absent in the Sorter's menu, guests can search the General List of Available Incentives, or GLAI, by key words using IM Search Engine.

To make guest fully understood the power of IM 110, there is an option of creating a Virtual Account, where guest can store any liked incentives that guest has chosen manually or through IM Optimizer. IM Optimizer provides listing of the offered incentives that are selected by visitor through several available filters such as "In proximity", "Cheapest", "Biggest discount", "The best warranty", etc. Planning a shopping, guest can make several calculations by using of IM Calculator to match his/her solvency with different combinations of offered incentives. Guest can even order a Comparison Shopping Engine option, which provides several available versions of chosen "shopping basket" at the same filters but at purchasing of some products in different stores and/or from different manufacturers, etc. As soon as guest leaves UM, the Virtual Account, he/she has opened on IM, will be erased.

However, guests are not allowed to obtain any of viewed incentives. To obtain desired incentives, guest has to become a registered User of UM. For that, visitor has to return on the STATUS page 106 and redefine himself under status "New User". After that visitor will be redirected on the "Opening of Account" page 116, where visitor should accomplish "Opening of a new account" procedure, as it is described in clauses 127-129 of the present embodiment.

Any registered User of UM can visit the Incentives Market 110 through User Account 107 and do there all, what a guest could do and much more. First of all, Users can take any incentive that is currently present on IM 110 and book it on their personal UA 107 under status "taken". That means that UA-holder will pursue to get awarded with this incentive in accordance with the incentive's RT&C within promotional time frame. According to UM Policy, in that case User can hold this incentive on his/her UA 107 no longer than some designated activation time. During this activation time UA-holder should accomplish required actions to change status of this incentive, or should return it in IM with the previous status "in distribution", "earned" or "partially awarded". (Only if the taken incentive was on IM 110 in the status "awarded", there is no activation time for keeping it on UA 107). Otherwise, after the activation time will expire, UM will automatically return this incentive in IM 110 with the previous status, i.e. with the same status that this incentive had before it was taken from IM 110 by the said User.

User can take and book on his/her UA 107 all or some of incentives that User has chosen and treated in the Virtual Account on IM 110 at his/her exercise with opportunities that IM 110 offers in conjunction with a visitor's plan for shopping.

IM 110 contains Expiration Alarm System that automatically alarms keepers of incentives about upcoming expiration date and removes incentive from circulation at this expiration date.

IM 110 maintains and regularly publishes its Incentive Popularity Index, or IPI, which reflects the relative frequency of the incentive use by Users.

IM 110 contains Forum with Chatrooms where visitors of IM 110 can meet each other, discuss problems, share their impressions, concerns and experiences, leave their acknowledgements for and suggestions to IM, etc.

Any UA 107 contains Depository where User can store any of useful information that he/she has found during User's activity on UM or outside of it. Only the User has an access to this Depository and UM is not responsible or controlling its content.

Any UA 107 contains Accounting Handling Instruction, or AHI, where User can fill up and keep special forms with instructions to UM how to handle this UA. It could be an instruction about what kind of incentives with status "to all Users" are allowed to be automatically deposited on UA, what kind of regular reports of UM the User wants to receive, etc.

Any UA 107 contains UM Messenger that informs User that there are some messages for him/her on the Forum or from UM and how many. By "clicking" on this Messenger, User will be redirected to the latest of those messages to read and, if User wants, to respond and to store or to delete it.

Directly from UA 107 any registered User has the ability to access the Incentive Exchange 111 under his/her regular "User name" or under random virtual nickname through the Nickname Encoder-Decoder 113.

Nickname Encoder-Decoder 113 is the main block of UM that provides security and intractability of the commercial activity and preferences of Users on UM and outside of it. At each usage of Nickname Encoder-Decoder 113, it creates random nickname, makes the one-to-one correspondence of this nickname with the regular User name, remembers this correspondence, and informs the User about his current nickname (by User choice, writes in on some carrier of information: prints on paper, records on tape recorder, stores in memory of any compatible device, etc). Starting at this moment and until User cancels the previously ordered usage of Encoder-Decoder 113, User will be recognized under currently acting nickname: in all User's actions in and out of UM he/she will be identified under this nickname, but all necessary transactions will appear on the User's UA that will still have the regular, not the random virtual nickname, "User name". As soon as User cancels the usage of current nickname, he/she will be recognizable under the regular "User name" again. At next usage of Nickname Encoder-Decoder 113 (which can be done at any further moment), all will start again: Nickname Encoder-Decoder 113 will create a new random virtual nickname, will make the one-to-one correspondence of this nickname with the regular "User name", will remember this correspondence, and will inform the User about his current (new) nickname, etc., etc. No virtual nicknames can coincide, and there cannot be any mismatches of the given User with someone else. In special cases (see later in the description of a participation of Users in auctions or bidding of incentives, or the procedure of redemption of incentives outside of UM) UM automatically cancels usage of nickname as soon as the goal for which it was activated is accomplished.

Being on the entry page of the Incentives Exchange, or IE, 111, Users can enjoy variety of possibilities of the selection and observation of all currently available incentives for exchange. Through the Navigator they can visit any of Sections of IE, arranging wanted displays beforehand by wanted categories of incentives (discounts, points, "buy x get y free", entry tickets, warranties, "buy x and get incentive for y", etc., etc.) and types of products or services (clothing, food, cars, games, etc., etc.). If something is absent in the Sorter's menu, Users can search the General List of Available Incentives for Exchange, or GLAIE, by key words using IE's Search Engine.

Users can enjoy an option of creating a Virtual Account on IE 111, where they can store any chosen incentives, that Users have chosen manually or due to IE Optimizer, which provides list of the offered incentives that are selected through several available filters such as "In proximity", "Cheapest", "Biggest discount", "The best warranty", etc. Planning his/her shopping, User can make several calculations by using the IE Calculator to analyze different opportunities of exchange. Users can even order a Comparison Exchange Engine option, etc. As soon as User leaves UM, the Virtual Account that User has opened on IE 111, will be erased.

User can entrusts the IE Automatic Exchange Engine, or AEE, to accomplish exchange of the User's incentive(s) for needed one(s) due to fulfilling the standard Trust Form that is provided by UM. In this case, AEE will find matching exchange and will do an automatic cross-transfer transactions of exchanged incentive(s) on the participating User Accounts, and will inform participants through UM Messenger about made exchange. In this case, UM will follow its basic Principle: "First come, first served", which means that the exchange will be done with the available matching incentive that has been presented for exchange on IE 111 first (the earliest one).

In case when direct exchange is currently not available, IE 111 will provide User with possibility of chain-exchange, when submitted incentive will be exchanged for a needed one due to chain of consecutive exchanges. For that opportunity User should use the IE Chain-Exchange Broker, or CEB, option. If CEB will find any chain of exchanges that is matching the User's request for exchange, CEB will do the automatic cross-transfer transactions of exchanged incentives on all participating User Accounts, and will inform participants through UM Messenger about made exchanges. In this case UM again will follow its basic Principle: "First come, first served", which means that the exchange will be done with the available matching chain of incentives that have been presented for exchange on IE 111 first (the earliest one).

If neither AEE, nor CEB options will find any currently available exchange of the submitted incentive for needed one, IE will provide User with an opportunity to submit his request to the IE General Broker, or GB. It means that submitter request for exchange will stay on IE waiting for appearance of the first matching opportunity for requested exchange, and as soon such opportunity appears the exchange will be automatically accomplished, and participants will be informed through UM Messenger about made exchange. In this case UM again will follow its basic Principle: "First come, first served", which means that the exchange will be done with a request that was submitted to GB first (the earliest one).

IE 111 contains Expiration Alarm System that automatically alarms keepers of incentives about upcoming expiration date and removes incentive from IE at this expiration date.

Users can donate any of unredeemed awarded incentives to UM. To do that User should mark the donated unwanted incentive with status "earned", "awarded" or "partially awarded" on his/her UA 107 and then "click" on the button "Donation". The marked incentive immediately will be taken off User's UA and placed under same status in the Incentive Market 110, and become available for other Users.

Being on his/her UA 107, any User can submit any booked incentive with status "earned", "awarded" or "partially awarded" to IE 111 for exchange through auction or bidding procedure.

Auction on IE 111 means that User, filing a standard "User's Auction Proclamation", or UAP, announces that he/she wants to exchange a certain incentive for another specified incentive and will do an exchange with that User whose counter-offer will satisfy to a certain condition. And this condition can be one of those that are based on some quantitative measure, such as "Whose counter-offer will have a biggest discount", "Whose counter-offer will have a lowest price of a product (or service)", etc. Each auction can be held no longer than a certain time defined in UM Policy. As soon this time will pass, the auction will be closed and the exchange will be automatically performed by the IE Manager, about which the participants of exchange will be informed through UM Messenger. If there will be no counter-offers, the submitting User will be informed through UM Messenger about it. In this case the submitted incentive will be automatically returned on the User's UA 107; and this incentive will not be allowed to be submitted on the auction during a certain time, which is defined in UM Policy.

Bidding on IE 111 means that User, filing a standard "User's Bidding Proclamation", or UBP, announces that he/she wants to exchange a certain incentive for the best incentive that will be counter-offered. The submitting User reserves a right for a sole discretion to decide which of the made counter-offers he will choose. Bidding can be held no longer than a certain time defined in UM Policy. As soon this time passes, the bidding will be closed; the submitting User will be informed through UM Messenger about it and he/she will have a certain time to make his/her choice, which bid to accept. During this period the User should inform IE 111 through standard procedure about his/her decision. At receiving of such decision of User, the IE Manager will automatically accomplish the exchange and will inform participants about it through UM Messenger. If there are no bids, submitting User will be informed through UM Messenger about it; the submitted incentive will be automatically returned on User's UA 107; and this incentive will not be allowed to be submitted for the bidding again for a certain period of time, which is defined in UM Policy.

IE 111 maintains and regularly publishes its Incentive Exchange Index, or IEI, which reflects the relative frequency of the exchange of incentive by Users.

IE 111 contains Forum with Chatrooms where Users can meet each other, discuss problems, share their impressions, concerns and experiences, leave their acknowledgements for and suggestions to IE, etc.

Any RA 109 contains Depository where Redeemer can store any of useful information that he/she found during his/her activity on UM and outside of UM. Only the Redeemer has an access to this Depository and UM is not responsible or controlling its content.

Any RA 109 contains Accounting Handling Instruction, or AHI, where Redeemer can fill up and keep special forms with instructions to UM of how to handle this RA: what kind of transactions are allowed to be automatically made in RA, what kind of regular reports of UM the Redeemer wants to receive, etc.

Any RA 109 contains the Verification Engine, or VE. Using this VE any Redeemer can verify any incentive that was submitted to him by the User for redemption. Request for verification should be done by the standard form, which is provided by VE, even through cross-platform communication devices (PC, mobile phone, FAX, etc.) from outside of UM.

Right through VE each registered Redeemer sends to UM the crucial information of the change of status of redeemed incentive and gets back verification of validity of incentives and what reward should be given at redemption. VE also supplies Redeemer with cumulative reports on incentives that were redeemed by the Redeemer during designated period.

To become a registered Redeemer, one has to define himself as a Redeemer on the STATUS page. After that visitor will be redirected on the "Opening of a new Redeemer Account" page where visitor will be offered the UM Policy. Visitor should carefully read and agree to the UM Policy. At acceptance of this Policy visitor will be offered Account Opening page where visitor can establish Redeemer Account, RA, 109; write Account Handling Instruction, AHI; choose password and login name for future log-in. Visitor, which will disagree with UM Policy and will not accept it, will be politely escorted out of UM.

Any RA 109 contains UM Messenger, which informs Redeemer that there are some messages for him/her (on the Forum or from UM, and how many). "Clicking" on this Messenger, Redeemer will be redirected to the latest of those messages to read and, if Redeemer wants, to respond.

UM Web Site contains InCent Exchange, or ICE, 117, devoted to activities that can occur between Givers, and between Givers and Redeemers. Being on the entry page of the InCents Exchange, or ICE, 117, visitors can enjoy variety of possibilities of the selection and observation of all currently available InCents for exchange. Through the ICE Navigator they can visit any of Sections of ICE that are allowed for certain category of visitors, arranging wanted displays beforehand by wanted categories of InCents (containing discounts, points, "buy x get y free", entry tickets, warranties, "buy x and get incentive for y", etc., etc.) and types of products or services (clothing, food, cars, games, etc., etc.) that InCents are concerning. If something is absent in the ICE's Sorter menu, visitors can search the General List of InCents for Exchange, or GLICE, and the General List of "to earn" InCents, or GLEIC, by key words using ICE's Search Engine.

Givers and Redeemers can enjoy an option of creating a Virtual Account on ICE 117, where they can store any liked InCents, that they have chosen manually or due to ICE's Optimizer, which provides list of the offered InCents that are selected through several available filters such as "In proximity", "Cheapest", "Biggest discount", "The best warranty", etc. Planning their own promotional programs, visitors of ICE 117 can make several calculations by using the ICE's Calculator to analyze different opportunities of chosen InCent's implementation in those programs. Visitors of ICE 117 can even order a Comparison Exchange Engine option. As soon as visitors leave UM, the Virtual Account, they have opened on ICE 117, will be erased.

Directly from RA 109 any registered Redeemer has the ability to access the InCent Exchange, or ICE, 117. Through the ICE's Navigator they can visit any of Sections allowed for Redeemers on ICE 117, arranging wanted displays beforehand by wanted categories of incentives (discounts, points, "buy x get y free", entry tickets, warranties, "buy x and get incentive for y", etc., etc.) and types of products or services (clothing, food, cars, games, etc., etc.). If something is absent in the Sorter's menu, Redeemers can search the General List of Available InCents, or GLAIC, by key words using ICE's Search Engine.

Redeemer can take any InCent that currently present on ICE 117 and claim it as a program he wants to be enrolled in as a Redeemer of incentives of this InCent. To do that, Redeemer should mark desired InCent and click on "Exchange verification desk" option. In response, the ICE's Manager will redirect Redeemer to the "Redemption Offer" page where Redeemer has to fill up a standard Redemption Offer Request Form, or RORF. This RORF will be sent to the InCent issuer's—the Giver's GA 108, and the Messenger will inform this Giver about it. During the designated Negotiation period, which is defined by UM Policy, the Giver, which has received RORF, should contact requesting Redeemer, negotiate a deal and they both, Redeemer and Giver, should come to the ICE Exchange verification desk through their Accounts and verify the made deal by filing standard Exchange Verification Form, or EVF. As soon as EVF is accepted by UM, the corresponding transaction of the involved InCent on the Redeemer's RA 109 will be done, and the involved Redeemer will be automatically registered in the Clearing Engine's Database on the Giver's GA 108 for future clearings of the redeemed incentives.

Every registered Redeemer has a possibility to participate in actions and bidding for InCents that are submitted by Givers on the ICE 117 for these purposes under status "for Redeemers". As soon as Redeemer wins an action or bidding, ICE Manager will automatically make transaction of the won InCent to the Redeemer's RA and will register this Redeemer in the Clearing Engine's Database on the Giver's GA, and will inform participants of this deal through UM Messenger.

Every registered Redeemer, who also is a retailer, has a possibility to open on the "Wholesale Mall" pages of ICE 117 his own auction or bidding for Givers, offering InCents under status "for Givers" where the award is the Redeemer-retailer's promise to buy a designated amount of the designated product for resale, if the Giver will satisfy to the designated conditions. And those conditions should contain some of a certain quantitative measure, such as "the biggest manufacturer discount", "the longest term of payment for purchase", etc.

Redeemer's auction on the "Wholesale Mall" pages of ICE 117 means that Redeemer, filing a standard "Redeemer's Auction Proclamation", or RAP, announces that he/she wants to exchange a certain InCents under status "for Givers", according to which Redeemer will buy some designated amount of the designated product for a designated price for resale from a Giver, whose counter-offer will better satisfy to a certain condition, than other's counter-offers. Each auction can be held no longer than a certain time defined in UM Policy. As soon as this time will pass, the auction will be closed and the exchange of offer and winning counter-offer will be automatically done by the ICE Manager, about which the participants of exchange will be informed through UM Messenger. If there will be no counter-offers, the submitting Redeemer will be informed through UM Messenger about it. In this case, the submitted InCent will be automatically taken off the auction; and this InCent will not be allowed for a submission on the auction of ICE 117 again for a certain time, which is defined in UM Policy.

Bidding on ICE 117 for a Redeemer's InCent means that Redeemer, filing a standard "Redeemer's Bidding Proclamation", or RBP, announces that he/she wants to exchange a certain InCent(s) under status "for Givers", according to which Redeemer will buy some designated amount of the designated product for a designated price for resale from a Giver, whose bid will better satisfy to a certain condition. The submitting Redeemer reserves a right for a sole discretion to decide which of the made bids he/she will choose. Bidding can be held no longer than a certain time defined in UM Policy. As soon as this time passes, the bidding will be closed; the submitting Redeemer will be informed through UM Messenger about it, and he/she will have a certain time to make his/her choice, which bid to accept. During this period, the Redeemer should inform ICE 117 through standard procedure about his/her decision. At receiving of such decision of Redeemer, the ICE Manager will automatically accomplish the exchange and will inform the participants about it through UM Messenger. If there will be no bids, the submitting Redeemer will be informed through UM Messenger about it. In this case the submitted InCent will be automatically taken off the bidding, and this InCent will not be allowed for submission for bidding on ICE 117 again during a certain time, which is defined in UM Policy.

Every registered Redeemer can entrusts the ICE Automatic Exchange Engine, or ICAEE, to accomplish exchange of his/her InCent(s) under status "for Givers" with matching Giver's InCent under status "for Redeemers". For that the Redeemer should fill a standard Redeemer Trust Form, or RTF, that is provided by the ICE 117. After acceptance of this RFT, ICAEE will find matching exchange(s) or enrollment agreement of Giver and will do an automatic cross-transfer transactions of exchanged InCent(s) on the participating Redeemer and Giver accounts respectively, and will inform participants through UM Messenger about made exchange. In this case UM will follow its basic Principle: "First come, first served", what means that the exchange will be done with the available matching InCent(s) that has been presented for exchange on ICE 117 first. If ICAEE will not find any matching Giver's InCent, the Redeemer's InCent will be kept on the ICE 117 some period, specified in UM Policy. If during that period there appears a matching offer from Giver, ICAEE will immediately accomplish exchange, will make corresponding transactions on the participant's accounts and will inform them through UM Messenger about it. If there will be no matching offers from Givers during said designated period, the submitting Redeemer will be informed through UM Messenger about it. In this case the submitted Redeemer's InCent will be automatically taken off ICE 117 and this InCent will not be allowed for a submission to ICE 117 again during a certain time, which is defined in the UM Policy.

Every registered Redeemer who has products of some registered Giver, but by some reason is not a registered Redeemer of incentives, which this Giver has issued for these products, can register as a Redeemer of this Giver on ICE 117. After that, the Redeemer will receive an automatic clearing of the redeemed incentives of that Giver, except cases when such an option is restricted by Giver in InCent's DI.

ICE 117 maintains and regularly publishes its InCents Exchange Index, or ICEI, which reflects the relative frequency of the exchange of InCents by Givers.

ICE 117 contains Forum with Chatrooms where Redeemers can meet each other, Givers can meet Givers, and Redeemers can meet Givers, discuss problems, deals, plans for future, share their impressions, concerns and experiences, leave their acknowledgements and suggestions for ICE, etc.

Any registered Giver, through opened GA 108, has an option to create an InCent 118. To do that, Giver has to use the Publisher 114 that contains all tools that are necessary for creation and registration of InCents. First of all, Giver should read and accept the UM Policy in regard of issuance of InCents. Then Giver should print and electronically sign the full text of incentive. This incentive should clearly state what tangible or intangible asset Giver will transfer to anybody who will accomplish behavior or achieves result required in the announced Rewarding Terms & Conditions within the announced time frame. This incentive should clearly state also that neither the required award-earning behavior, nor required award-winning result(s) can be legally considered as a job done for the Giver or on behalf of the Giver. Then Giver should print or post the signed full text of the Rewarding Terms & Conditions, or RT&C, which accompanies this incentive. RT&C should contain clear and straight description of quantity and quality of reward, terms & conditions of rewarding, when, where and how it can be obtained; the sequence and terms of reward-winning behavior and achieved results, time frame of required actions to be done; and the incentive's expiration date. RT&C are published for the Users and they have to be written in plain English. Then Giver should publish the Distribution Instruction, or DI, for UM. DI has to define the initial status of InCent: "in distribution", "to all Users", "to earn", "for Redeemers" or "exchangeable". Giver has to define in DI how many incentives of the given InCent can be distributed. Then Giver can accompany InCent with the Associated Promotional Materials, or APM, in frames and form that is defined by UM Policy. And finally, Giver should create the symbolic image of incentive: appropriate picture, drawing, collage, etc. with accompanied informative text using Giver's own design or through the Publisher's 114 tools and Archives. This Image is exactly a recognizable "face" of incentive, because it is shown to viewers each time when any of them wants to know what this incentive is about. The content of image should satisfy many of requirements of Law, so that this content is strictly limited by UM Policy. The five listed above documents: incentive, RT&C, APM, DI and Image of incentive together do complete the content of InCent. The UM Publisher 114 provides a strong support of creation of all those documents. Publisher 114 also contains the Library of Standard Images, or LSI, which could be very useful at creation of images of incentives. Created InCents are stored in the Storage of InCents 118, or SI, on UM under unique serial number, and this serial number is attributed to each five documents that do complete this InCent.

Being on their GA 108, Givers have a possibility to edit already issued InCents 118. If such editorial changes do not concern the content of incentive and/or of RT&C, it is the Giver's discretion to save changed InCent under the same serial number or attribute it (and all five its documents!) with a new serial number. However, any changes in the content of incentive and/or of RT&C will lead to the saving of the edited InCent in SI 115 under a new serial number.

InCent is the only place where said five documents that Givers are issuing in conjunction with any promotion program which he/she/it is distributing through UM, are stored and exist in the genuine form. All other appearances of any document from any InCent on demand of visitor of UM are actually the appearance of copies of this document that are taken from the InCent 118 in SI 115 and displayed for this visitor. All booking on any account, transfer to any other place of any document from any InCent are actually the booking and transfer of the serial number of InCent along with an ordinal number of a copy of that document from InCent 118 in SI 115. In other words, physical (digital) image of any part of InCent, initially created by a Giver, forever stays in the Storage of InCents 115 as a part of a stored InCent 118. Any usage of any document from InCent always is a usage of a link to this genuine InCent in SI 115, or of some consecutive exemplar of a copy of document from this genuine InCent in SI 115. It means that no one, not having access to the UM database directly as a master-administrator, can forge any already issued InCent.

Through GA 108, any registered Giver can directly visit InCent Exchange 117. Being there, Giver can participate in any auction or bidding initiated by any Redeemer. In the Forum and Chatroom of ICE 117 any Giver can meet other Givers and/or Redeemers and discuss problems, share his/her impressions, concerns and experience, leave acknowledgements for, and suggestions to, ICE, etc.

Any Giver has a right and a possibility to submit through GA 109 his/her InCents in status "to earn", "for Redeemers" and "exchangeable" for exchange on ICE 117 with other Givers and Redeemers. Giver can do that in three different ways: through an automatic exchange option, through auction and/or through bidding.

Every registered Giver has a possibility to open on the "Wholesale Mall" pages of ICE 117 his own auction or bidding for Givers or for Redeemers. Giver's auction on the "Wholesale Mall" pages of ICE 117 means that Giver, filing a standard "Giver's Auction Proclamation", or GAP, announces that he/she wants to exchange a certain InCent under status "to earn", or "for Redeemers", or "exchangeable" (which can be used by a winner of auction or bidding as an award in the winner's own incentives), for the winner's promise to buy the biggest lot of the Giver's product at announced price, or to accompany the won InCent with the biggest discount, or some another condition having the biggest metric measure. Each auction can be held no longer than a certain time defined in UM Policy. As soon as this time passes, the auction will be closed and the exchange of the Giver's offer and winning counter-offer will be automatically done by the ICE's Manager, about which the participants of exchange will be informed through UM Messenger. If there will be no counter-offers, the submitting Giver will be informed through UM Messenger about it. In this case the submitted InCent will be automatically taken off the auction and this InCent will not be allowed for a submission on the auction of ICE 117 again for a certain time, which is defined in UM Policy.

Bidding on ICE 117 for a Giver's InCent means that Redeemer, filing a standard "Giver's Bidding Proclamation", or GBP, with the same offer as in an auction case, but reserving a right for a sole discretion to decide which of the made bids Giver will choose. Bidding can be held no longer than a certain time defined in UM Policy. As soon as this time will pass, the bidding will be closed; the submitting Giver will be informed through UM Messenger about it, and he/she will have a certain time to make his/her choice, which bid to accept. During this period the Giver should inform ICE 117 through standard procedure about his/her decision. At receiving of such decision of Giver, the ICE's Manager will automatically accomplish the exchange and will inform the participants about it through UM Messenger. If there will be no bids, the submitting Giver will be informed through UM Messenger about it. In this case the submitted InCent will be automatically taken off the bidding; and this InCent will not be allowed for a submission for bidding on ICE 117 again during a certain time, which is defined in UM Policy.

Every registered Giver can entrusts the ICE's Automatic Exchange Engine, or ICAEE, to accomplish exchange of his/her InCent(s) under status "to earn", or "for Redeemers", or "exchangeable", or "for Givers" with matching InCent(s) under status "to earn", or "for Redeemers", or "exchangeable", or "for Givers". For that the Giver should fill up a standard Giver Trust Form, or GTF, that is provided by the ICE 117. After acceptance of this GFT, ICAEE will find matching exchange(s) or enrollment agreement of other Giver(s) or Redeemer(s) respectfully, and will do an automatic cross-transfer transactions of exchanged InCent(s) on the participating parties' accounts, and will inform participants through UM Messenger about made exchange. In this case UM will follow its basic Principle: "First come, first served", what means that the exchange will be done with the available matching InCent(s) that has been presented for exchange on ICE 117 first. If ICAEE will not find any matching InCent, the Giver's InCent will be kept on the ICE 117 some period, specified in UM Policy. If during that period there appears a matching offer from someone, ICAEE will immediately accomplish exchange, will make corresponding transactions on the participants' accounts and will inform them through UM Messenger about it. If there will be no matching offers from anyone during said designated period, the submitting Giver will be informed through UM Messenger about it. In this case the submitted Giver's InCent will be automatically taken off ICE 117; and this InCent will not be allowed for a submission to ICE 117 again during a certain time, which is defined in the UM Policy.

Any registered User, Redeemer and/or Giver have a right and a possibility to reach UM 24/7 through any cross-platform Internet-compatible connection that is accepted by UM from outside of UM, 112. No matter is User acting in outside of UM under his/her User name, or under nickname, he/she can reach his/her UA 107 in UM anytime.

As UM Policy states, there cannot be 100% promised warranty of security and anonymity for Users of Internet. But UM Policy states that if the registered User of UM (each time he/she comes in contact with any registered Redeemer or anybody else) uses nickname, which User receives for that contact from UM, he will be covered by highest warranty of security and anonymity of such a contact. The only thing that User has to do is to connect to UM and request a nickname for that contact. This request can be done in a preliminary session with UM, or directly at the place of this contact before it starts. In most occasions, this nickname will be erased forever from usage automatically by UM just as the contact will be accomplished (see explanation in the next clause). However, in some cases, it is the User's duty and concern to inform UM that contact is accomplished and used nickname should be no longer valid and has to be erased forever from usage (see explanation in the next clause).

If a registered User wants to redeem some incentives that he/she has on his/her UA in UM, User has to follow UM Policy and accomplish certain preliminary actions. Those actions depend on whether or not the Redeemer's Point of Redemption, or POR, has "on-line" connection with UM. First of all, User has to receive (from UM) a virtual nickname for each single case of redemption of incentives, no matter if User is acting anonymously or under a totally transparent status. This virtual nickname will be in effect only for ONE process of redemption at redemption point (For instance, for redemption of discounts at purchase of products in store that should be reflected in one receipt. For usage of other incentives at another approach to a point of sale, even in the same store, but with another set of products for purchase, after the first purchase and full payment for it were done, User has to take a new virtual nickname from UM).

Figure 2:
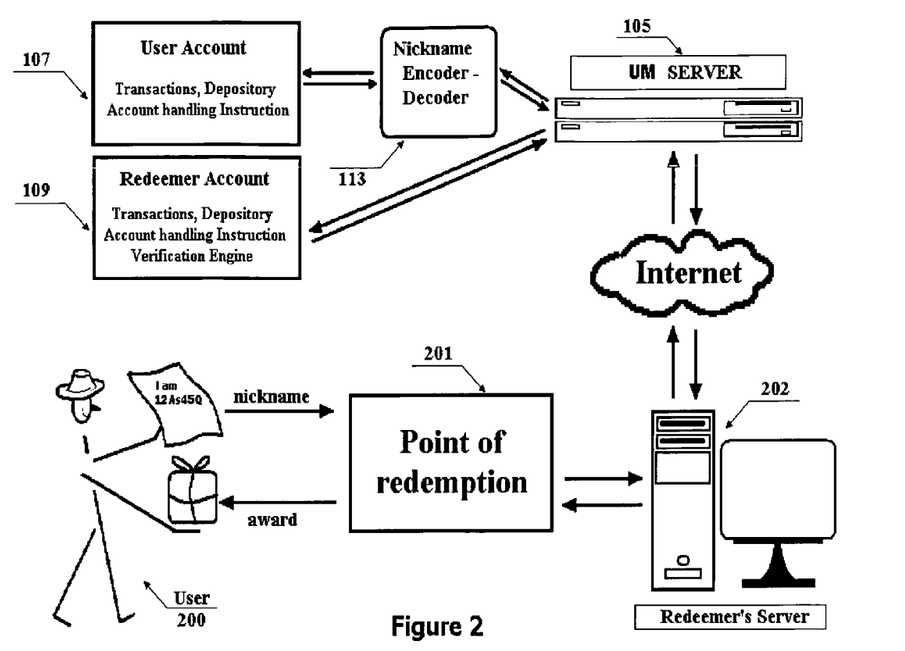
FIG. 2: Schematics of interaction of User with Redeemer at the Point of Redemption (particularly—at Point of Sale in store) in case when Redeemer's server has on-line connection with UM server. User presents his/her nickname to the Redeemer in any acceptable manner. Redeemer enters this nickname and all information connected with redemption (particularly—scans barcodes of all merchandises selected by User to buy) in the Redeemer's Server, which transfers this data to UM server via Internet. UM server decodes User's current nickname, analyses User's UA, selects all incentives that are applicable to the given redemption event (particularly—that are applicable to all and any merchandize that User is intended to buy) and sends corresponding information back to the Redeemer's server to be included in bill. If User accepts bill and arranges payment, Redeemer seals the deal (particularly—issues the receipt for payment) and the Redeemer's server sends final information to the UM server. At receiving of such information, UM server makes all necessary entries in all involved accounts and erases the used nickname forever. User gets his purchase together with deserved award and "Thank you!" from Redeemer. The main feature of this method of redemption is that no other proof of right on award beside the User's nickname is needed.

As the FIG. 2 shows, if the POR 201 has "on-line" connection (through its server 202) to UM, all that the User has to do is inform Redeemer what the current User's nickname is. This information can be passed to POR in any acceptable way: verbally, so that Redeemer can enter it in POR's computer manually; scanning the display on the User's wireless phone; through electronic connection POR to the User's wireless device, etc, etc. In this case Redeemer's server 202 sends to UM all information that is needed for UM to identify which registered User has come to Redeemer, which Redeemer makes the redemption, and what incentives are involved in the redemption process. Having that information, UM server 105 decodes received nickname in the Nickname Encoder-Decoder 113 and identifies User's account; checks out and presents all involved incentives on this UA 107; makes the analysis of an applicability of those incentives to requested redemption; and sends all required information on the applicable incentives back to the Redeemer's server 202 to be included in the User's receipt. After receiving this information from UM, the Redeemer's server 202 forms the receipt in POR 201, which includes all applicable incentives from User's UA; so that operator of POR could pass the desired and deserved award to the User. When all other required operations (for instance, payment for selected products) are complete, Redeemer's Server 202 sends to UM the confirmation about accomplishment of the redemption. Receiving this information, the UM server 105 makes all necessary transactions on all involved accounts (UA and RA), erases used virtual nickname of User (so that User cannot use old nickname anymore: even if User attempts to do so, UM will reject any request under this nickname); and sends "thank you" message to the Redeemer.

Figure 3:
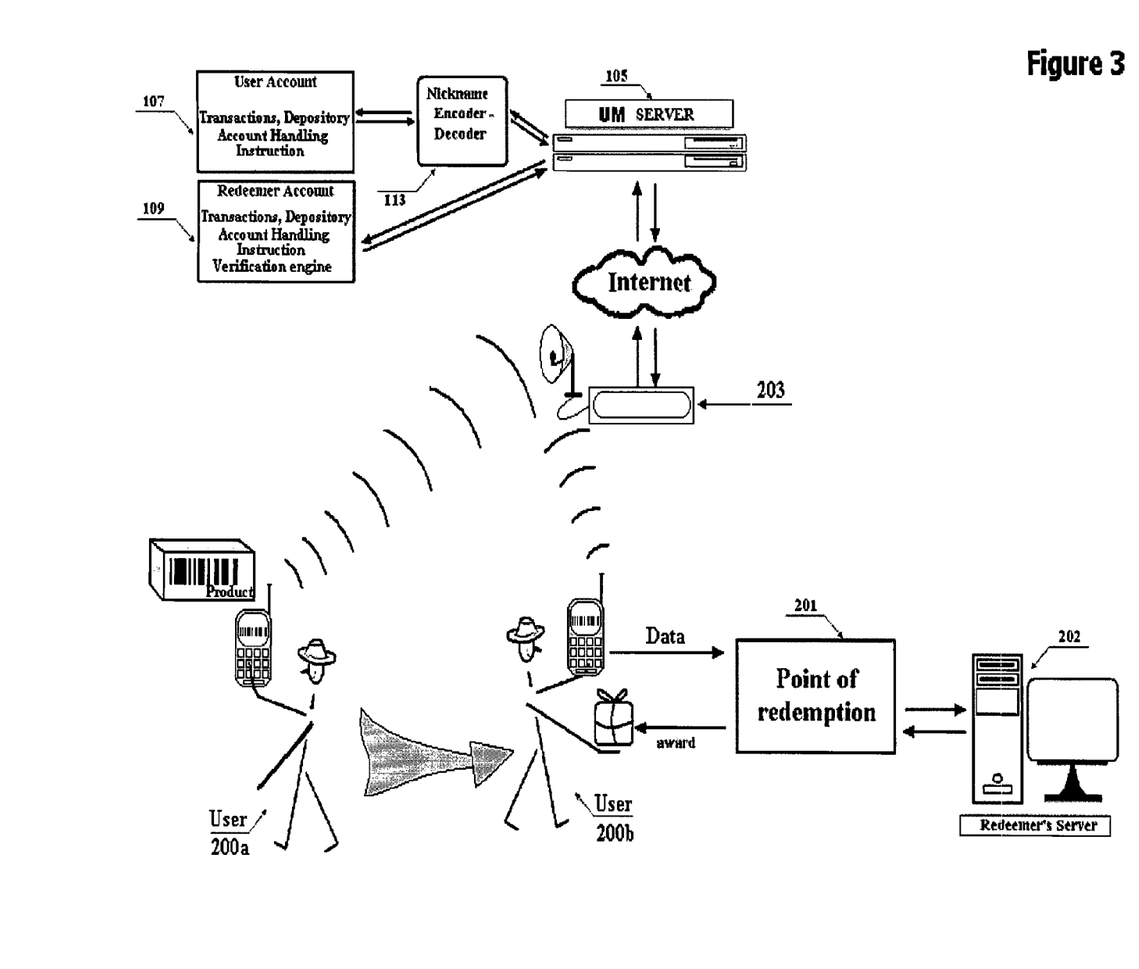

If, by some reason, POR 201 of some registered Redeemer is not in "on-line" regime, the registered User can redeem his/her incentives in the way, which is illustrated in FIG. 3. In this case registered Users can apply any cross-platform connection with UM, which they are able to reach. Particularly, they can use wireless phones, or any other hand held digital communication device, or kiosk as it is illustrated in FIG. 3 (see 200a-200b).

The procedure 200a-200b of a wireless connection with UM, which is shown in FIG. 3, is the same at any occasion when a registered User wants to contact UM for any reason (to "explain" to UM what products User has chosen in his cart for the current purchase, 200a in FIG. 3; to request virtual nickname; to recall what incentives he/she already has collected on his/her UA; to find out what incentives of just "scanned" product do exist on UM, and can be taken; to make some additional research of availability of exchange his/her incentives for needed ones; to prevent some already collected incentives to be used at following purchase; etc, etc).

Using a wireless phone, the User, being in the store or other place of redemption, can scan barcodes (or other product identification labels) of items he/she has chosen to buy (or receive) and can send this information to the UM server 105 via Internet through a corresponding wireless service provider 203. This communication can require usage of pre-downloaded program into a phone, or even a new type of a mobile device, that is especially pre-programmed for such purposes, but this aspect is not a matter of the present invention. Under option "From POR" UM provides receiving of such information and recognizes User's request for a preparation of information on all incentives from his/her account, which are applicable for chosen items, to be passed to POR 201 for redemption at this particular event of purchase (or receiving). UM provides transmission all requested information back to User's phone: full set of the serial numbers of all incentives that are applicable to the User's purchase (or receiving) cart together with special code for each of these serial numbers, which will confirm authenticity of incentive.

As soon as User completes his/her "purchase cart" and comes to the POR 201, he/she should pass information, just collected from UM, to POR 201. This information can be passed to POR in any acceptable way: screening the display on the User's wireless phone where an appropriate bar code with needed information was generated; through electronic connection POR to the User's digital device, etc, etc. Receiving such information, the Redeemer's POR recognizes that all submitted incentives are authentic, indeed came from UM; generates bill, and after receiving needed payment from User—generates a receipt where all applicable incentives are accounted automatically. When all other required operations (for instance, payment for selected products) are completed, the information containing the accomplishment of the redemption is sent to UM. There are many ways to form and send this information to UM. For instance, simple way is to scan by phone an appropriate screen that is generated on the monitor of POR. If User's phone is already at electronic connection with POR, sending of said information is much easier. Receiving said information, the UM server 105 recognizes which registered Redeemer was involved in the event of redemption, and makes all necessary transactions on all involved accounts (UA 107 and RA 109). After that UM erases used virtual nickname of User, and send a "thank you" message to the screen of User's phone.

While particular elements, embodiments and applications of the present invention have been described with sufficient details, it will be understood that the invention is not limited thereto since modifications that may be done by those skilled in the art. It is thereof contemplated by the appended claims to cover such modifications as incorporate those features, which come within the scope and spirit of the present invention.

The invention claimed is:

1. A system comprising:
    an Internet-connected server, comprising a computing appliance and data storage elements;
    instructions executed from a non-transitory storage medium by a processor of the computing appliance, the instructions causing the processor to perform a process comprising:
        registering users of the system as creator/owners, customers, or redeemers;
        creating an account for each creator/owner, customer, or redeemer;
        providing a first interactive interface enabling registered creator/owners to create promotional program packages (PPPs), each having a unique identity, the PPPs comprising incentives and rules for distribution and management of the incentives;
        providing a second interactive interface enabling registered customers to access their customer accounts, set preferences for incentives, and to interact with incentives posted to their accounts;
        providing a third interactive interface enabling redeemers to interact with the system in verifying behavior defined by incentives and providing redemptive value;
        tracking activity of creator/owners, customers, and redeemers, including at least use of incentives in PPPs by customers;
        recording and maintaining status of PPPs; and
        providing a marketplace through the interactive interfaces for exchange of PPPs as financial instruments.

2. The system of claim 1, wherein each PPP also includes at least a symbolic image of each incentive, required actions, behavior and conditions for redemption of incentives, a time frame for distribution of incentives and promotional materials associated with incentives.

3. The system of claim 2, wherein incentives include any legally enforceable promise of the creator/owner of the incentives to make a transfer of tangible or intangible asset to a customer and/or redeemer, if the customer and/or redeemer accomplishes actions or behavior, or achieves results required in designated conditions within the time frame of the incentive set within the PPP.

4. The system of claim 1 wherein exchange of the PPPs includes at least buying, selling and trading between creators/owners.

5. The system of claim 1, wherein the Redeemers are retailers providing at least a point of redemption for users of incentives, enroll in PPPs and negotiate with the creator/owners for Redeemer incentives.

6. The system of claim 5 wherein Redeemers bid for enrollment with PPPs in the marketplace.

7. The system of claim 1 wherein a process is included to track status of PPPs including at least exchangeable, used, canceled or expired.

8. The system of claim 1 wherein a process is included to track status of incentives including at least returned, donated, exchanged, verified, redeemed, or expired.

9. The system of claim 1 wherein the incentives are exchanged in the marketplace by trading, donating or bidding by users.

10. The system of claim 1 wherein created PPPs are stored, edited and re-issued with a new unique identity.

11. A method comprising:
    registering users at an Internet-connected server, the server comprising a computing appliance and data storage elements, the computing appliance having a processor executing instructions causing the server to register the users as creator/owners, customers, or redeemers;
    creating an account for each creator/owner, customer, or redeemer;
    providing a first interactive interface enabling registered creator/owners to create promotional program packages (PPPs), each having a unique identity, the PPPs comprising incentives and rules for distribution and management of the incentives;
    providing a second interactive interface enabling registered customers to access their customer accounts, set preferences for incentives, and to interact with incentives posted to their accounts;
    providing a third interactive interface enabling redeemers to interact with the system in verifying behavior defined by incentives and providing redemptive value;
    tracking activity of creator/owners, customers, and redeemers, including at least use of incentives in PPPs by customers;
    recording and maintaining status of PPPs; and
    providing a marketplace through the interactive interfaces for exchange of PPPs as financial instruments.

12. The method of claim 11, wherein each PPP also includes at least a symbolic image of each incentive, required actions, behavior and conditions for redemption of incentives, a time frame for distribution of incentives and promotional materials associated with incentives.

13. The method of claim 12, wherein incentives include any legally enforceable promise of the creator/owner of the incentives to make a transfer of tangible or intangible asset to a customer and/or redeemer, if the customer and/or redeemer accomplishes actions or behavior, or achieves results required in designated conditions within the time frame of the incentive set within the PPP.

14. The method of claim 11 wherein exchange of the PPPs includes at least buying, selling and trading between creators/owners.

15. The method of claim 11, wherein the Redeemers are retailers providing at least a point of redemption for users of incentives, enroll in PPPs and negotiate with the creator/owners for Redeemer incentives.

16. The method of claim 15 wherein Redeemers bid for enrollment with PPPs in the marketplace.

17. The method of claim 11 wherein a process is included to track status of PPPs including at least exchangeable, used, canceled or expired.

18. The method of claim 11 wherein a process is included to track status of incentives including at least returned, donated, exchanged, verified, redeemed, or expired.

19. The method of claim 11 wherein the incentives are exchanged in the marketplace by at least trading, donating or bidding by users.

20. The method of claim 11 wherein created PPPs are stored, edited and re-issued with a new unique identity.

* * * * *